Jan. 22, 1946.   E. W. GREENFIELD   2,393,466
CABLE FOR PRODUCTION OF MAGNETIC FIELDS
Filed Nov. 14, 1942   2 Sheets-Sheet 1

INVENTOR.
E.W. GREENFIELD
BY

Jan. 22, 1946. E. W. GREENFIELD 2,393,466
CABLE FOR PRODUCTION OF MAGNETIC FIELDS
Filed Nov. 14, 1942 2 Sheets-Sheet 2

INVENTOR.
E.W. GREENFIELD
BY

Patented Jan. 22, 1946

2,393,466

UNITED STATES PATENT OFFICE 2,393,466

CABLE FOR PRODUCTION OF MAGNETIC FIELDS

Eugene W. Greenfield, Hastings on Hudson, N. Y., assignor to Anaconda Wire and Cable Company, New York, N. Y., a corporation of Delaware Application November 14, 1942, Serial No. 465,819

8 Claims. (Cl. 174—110)

The present invention relates to a device for the production of magnetic fields throughout a body of water, one of the primary objects being to provide a device which will accomplish this object without the use of dual electrodes. A further object of the invention is to provide a device for the production of magnetic fields which, having a specific gravity less than that of water, will float without the use of supporting rafts or buoys.

One use to which such a field may be put is the location of submarine cables which require servicing or repair. If an extremely sensitive current detection device is connected with the cable at a point where it emerges from the water, its location may be very closely estimated, even at a point far off shore, if a pulsing magnetic field, which may be produced by buoyant electrodes, is brought into the vicinity of the submerged cable. Obviously, the current induced in the cable will increase as the magnetic field approaches the submerged cable. Once the approximate location of the cable has been determined grappling hooks or similar devices may be used to bring it to the surface for repairs.

In practical cable maintenance operations, the device of the present invention may be towed behind a vessel so that a large area may be rapidly searched. Since the distance along the length of the cable between the fault and a known point may be determined by a Wheatstone bridge, and since the cable itself may be located by moving a magnetic field in a direction which intersects the line of the cable, the use of the device of the present invention makes it possible to quickly locate the cable at a point very close to the fault without delay.

In a copending application, Serial No. 423,842, filed December 20, 1941, the inventors have disclosed a buoyant electrode designed for the production of a magnetic field within a body of water. In that application it is suggested that a pair of buoyant electrodes, which consists essentially of a conducting element applied to a buoyant core, may be towed behind a vessel, the electrodes being energized so that there is a flow of current through the water between them. This will result in a creation of a magnetic field which may be employed for the location of submarine cables. If it becomes desirable to separate the field created by the electrodes from incidental fields which may be generated by the towing vessel the buoyant electrodes may be pulled behind the ship at a considerable distance and still be connected with a source of electrical energy by means of shielded or concentric cables which do not create a magnetic field. By such an arrangement it is possible to create a zone several hundred feet in width and length which is subjected to a magnetic field and, is also a considerable distance from the towing vessel.

It is the primary purpose of this invention to make available a device which will efficiently create a magnetic field throughout a body of water without the disadvantages of buoyant electrodes. One specific object of this invention is to provide means for creating a magnetic field without the use of multiple electrodes, a single cable taking their place.

A further object is to establish a magnetic field without bringing the conducting material of which the electrode is formed in contact with the surrounding water. This, of course, is an advantage of the utmost importance since it eliminates the loss of metal from the electrode by electrolytic action.

Other advantages and features of the present invention, as well as its manner of operation will be apparent from the following description when read in connection with the accompanying drawings in which similar reference numerals denote similar parts and in which.

An explanation of the principles underlying the present invention is simplified by reference to the diagrammatic drawings, Figures 1 to 4, which represent the magnetic fields created by the flow of electric current through conductors arranged in various combinations. It is well known that iron filings, if dispersed in the vicinity of a magnetic field, will arrange themselves in patterns from which the zones of stress may be charted.

Figure 1:
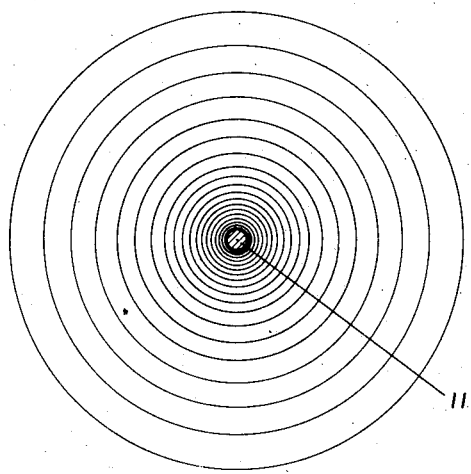
Figure 1 is a schematic view of the magnetic lines of force created by the flow of current through a single conductor.

For example, Figure 1 shows the magnetic field about a single wire 11 carrying a direct current, the return wire being located at a very distant or theoretically infinite point. The lines of force may be represented in this case by a series of concentrically arranged circles of increasing size.

Figure 2:
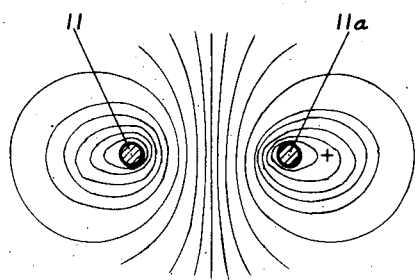
Figure 2 is a view similar to Figure 1 of the magnetic lines of force created by the passage of electric current through two unshielded conductors.

If the return conductor 11a is now arranged parallel and relatively close to the first conductor 11 the pattern is changed as shown in Figure 2. In the limited space immediately between the conductors the fields reinforce each other, but at points external to the conductors they cancel one another so that the resultant magnetic field at a short distance from the pair of conductors is practically nil. Therefore an insulated structure containing two parallel unshielded conductors would be ineffective as a means of generating a magnetic field because the flux from the "go" conductor nullifies that of the "return" wire.

Figure 3:
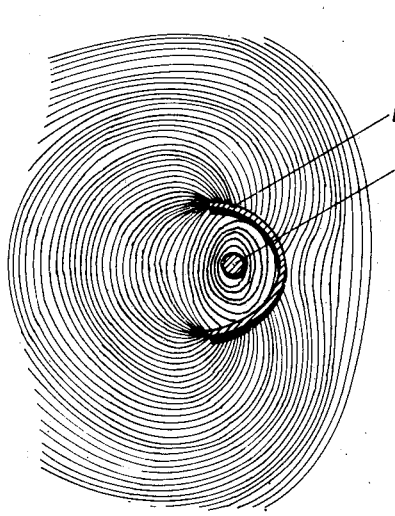
Figure 3 is a view similar to Figure 1 illustrating the magnetic lines of force caused by the flow of current through a single semi-shielded conductor.
Figure 4:
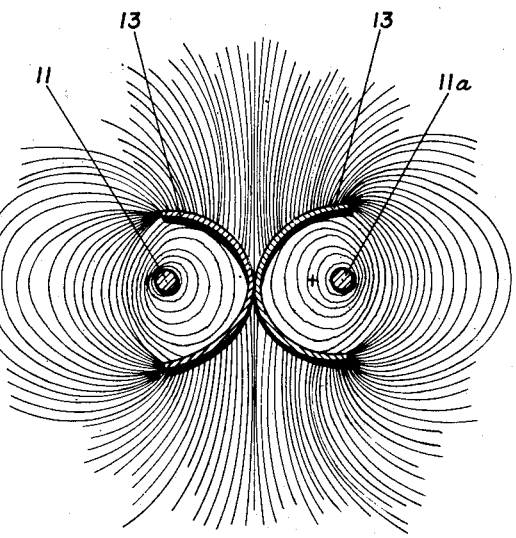
Figure 4 is a view similar to Figure 1 illustrating the magnetic lines of force caused by the flow of current through a pair of semi-shielded conductors.

Figure 3, which is to be compared with Figure 1 since it illustrates a single conductor with a distant turn, shows the effect of using a curved magnetic shield partially enclosing the conductor. Obviously the field becomes greatly distorted and is bulged out on the unshielded side of the conductor. This effect is still further increased if a pair of conductors, each provided with curved shields to distort the lines of force, are placed close to each other as shown in Figure 4. As the drawing indicates the field from each conductor is beamed outward and away from the companion wire for a considerable distance. In fact the effect of the shields is much greater than the drawing indicates since tests show that it is possible by this arrangement, to create a magnetic field which is effective, for the purposes of this invention throughout a volume of water which is vastly greater than when a pair of unshielded conductors are used. Stating this another way, the only effective magnetic field with the arrangement of conductors shown in Figure 2 lies between the conductors. When curved shields are used to focus and beam the lines of force this is no longer true. It has been shown that parallel conductors two inches apart and separated by curved magnetic shields will create, with the same current, a magnetic field which is similar to one produced by a pair of unshielded conductors located one hundred inches apart. In other words the use of the shields has created a fifty-fold, fictitious separation of the "go" and "return" conductors.

From the foregoing discussion it is apparent that it is possible to arrange a pair of conductors, if suitably shielded and placed within an insulated structure, so that they are not in contact with the surrounding water and yet produce a magnetic field which is similar to that created by a pair of widely separated uninsulated conductors immersed in water. Therefore it becomes possible to design a single buoyant cable which will have the important advantages of compactness, uniformity of action regardless of such factors as the concentration of salt in the surrounding water and furthermore does not deteriorate through electrolytic action since the conductors are not in contact with the water.

Figure 5:
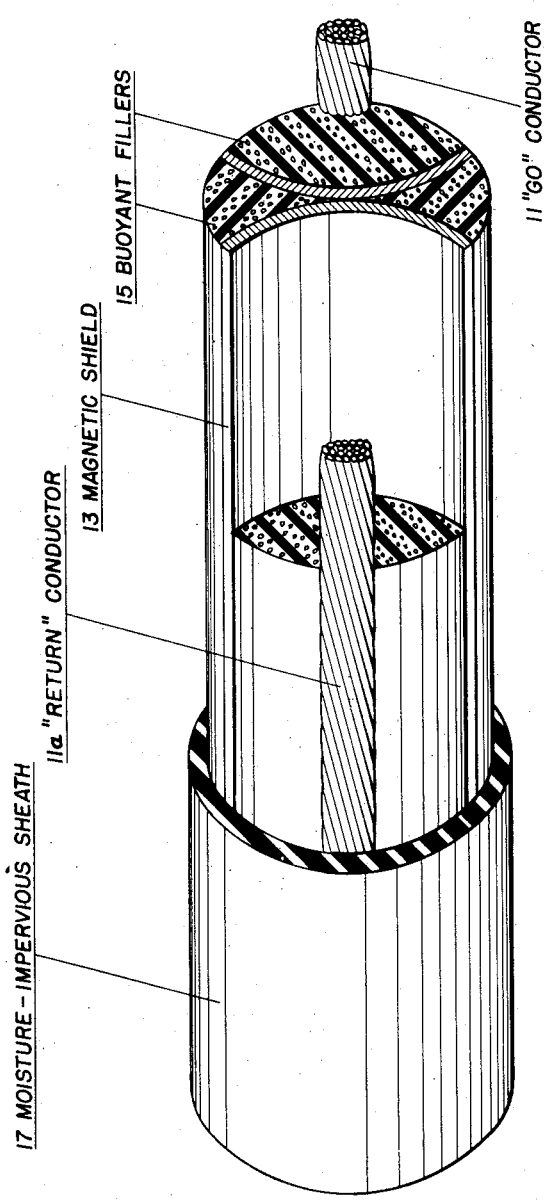
Figure 5 is a perspective view, certain parts having been broken away to reveal the interior construction, of a cable embodying the present invention.

Figure 5 illustrates a cable which is designed in accordance with these considerations. A pair of conductors 11, preferably stranded to increase their flexibility, are arranged in parallel relationship with a separation of several inches. Arranged between the conductors is a pair of concave shields 13 formed of magnetic material such as iron which serve to focus or beam the magnetic field of "go" conductor 11 away from the companion "return" conductor 11a. Since it is essential that the entire assembly have a specific gravity less than that of water so that it will float, buoyant fillers 15 made of light, resilient material such as sponge rubber are used to occupy the spaces between the shields and the conductors. The entire assembly is enclosed within a moisture impervious sheath 17 of rubber or any sufficiently flexible material or combination of materials which will prevent moisture from entering the interior of the cable. While this description has referred to the conductors as being arranged "parallel" to each other it will be understood that this is intended to cover a construction in which the conductors and shields are helically arranged to secure greater flexibility. In addition the magnetic field will then cover a cylindrical volume of water instead of a relatively smaller parallelopiped as the direction of the beam changes radially along the length of the cable.

In use it is contemplated that the cable of the present invention would be connected with a ship provided with a source of electrical energy by a coaxial or shielded cable which is inert as far as the creation of an external magnetic field is concerned and the "go" and "return" conductors of the cable are connected together at their extreme ends so as to form a complete electrical circuit.

From the nature of this cable it will be apparent that in designing for any given condition it will be necessary first to ascertain the size of conductors and shields which will be necessary, and then to calculate the weight of each element involved in the construction. If the specific gravity of the completed cable designed in this manner is considerably above that of water it will be necessary to increase the quantity of the sponge rubber or other buoyant filler so as to give a greater buoyancy to the cable. Conversely, the thickness of the layer of sponge rubber may be decreased if the specific gravity is considerably less than that of water.

It will be obvious from the description of the present invention that many changes may be made in the materials of which the conductor or sheath are formed, and that it is to be understood that the device may be modified in many ways without departing from the spirit of the invention or the scope of the following claims. Specifically, various synthetic or natural resins which are capable of carrying considerable quantities of gas in finely divided form may be substituted for the sponge rubber or sheath.

What I claim is:

1. A cable for the creation of magnetic fields including a pair of parallel conductors and means located between said conductors for beaming the magnetic field.

2. A cable of the type described comprising two electric conductors and beaming means located between the conductors effective to distort the magnetic field.

3. The cable of claim 2 in which the specific gravity of the cable is less than that of water.

4. An electric cable of the type described comprising a pair of electric conductors arranged in parallel relationship and shielding means located between said conductors effective to beam the magnetic field which results when the conductors are energized as a part of the same circuit.

5. An electric cable comprising a plurality of electric conductors, shielding means located between said conductors effective to beam outwardly from the axis of the cable the magnetic field created by energizing the conductors.

6. The cable of claim 5 in which the conductors and shielding means are helically arranged.

7. The cable of claim 5 in which the weight of the completed cable is less than that of a body of water of the same volume.

8. A buoyant electric cable comprising a plurality of electric conductors, concave shielding means arranged between said conductors, said conductors and shielding means being enclosed within a moisture-proof jacket.

EUGENE W. GREENFIELD.